United States Patent [19]

Merritt

[11] 4,276,312
[45] Jun. 30, 1981

[54] ENCAPSULATION OF MATERIALS

[76] Inventor: Carleton G. Merritt, R.D. #1, Slayton Rd., Cato, N.Y. 13033

[21] Appl. No.: 113,319

[22] Filed: Jan. 18, 1980

Related U.S. Application Data

[63] Continuation of Ser. No. 909,390, May 25, 1978, abandoned, which is a continuation-in-part of Ser. No. 804,019, Jun. 6, 1977, abandoned, which is a continuation-in-part of Ser. No. 693,563, Jun. 7, 1976, abandoned.

[51] Int. Cl.$^3$ .................... A23L 1/22; A23L 1/226
[52] U.S. Cl. ........................... 426/96; 426/533; 426/650; 426/651; 426/657; 426/658; 426/661; 426/471
[58] Field of Search ............... 426/96, 98, 533, 650, 426/651, 657, 658, 661, 471; 252/316; 424/34, 35, 37

[56] References Cited

U.S. PATENT DOCUMENTS

| | | | |
|---|---|---|---|
| 2,809,895 | 10/1957 | Swisher | 426/651 X |
| 2,876,160 | 3/1959 | Schoch et al. | 426/98 X |
| 3,041,180 | 6/1962 | Swisher | 426/96 |
| 3,159,585 | 12/1964 | Evans | 426/103 X |
| 3,264,114 | 8/1966 | Glicksman et al. | 426/103 X |
| 3,554,768 | 1/1971 | Feldman | 426/385 |
| 3,704,137 | 11/1972 | Beck | 426/96 X |
| 3,736,149 | 5/1973 | Knapp | 426/96 |
| 3,786,159 | 1/1974 | Sato et al. | 426/96 X |
| 3,821,436 | 6/1974 | Fry | 426/650 |
| 4,022,924 | 5/1977 | Mitchell et al. | 426/590 X |

Primary Examiner—Robert A. Yoncoskie

[57] ABSTRACT

A free flowing, spray dried, rod-shaped particulate product, which is readily redispersible in water, is produced by preparing an aqueous solution of an encapsulating material, forming a dispersion by adding an active material to the solution, and spray drying the dispersion through a nozzle having a relatively small vortex device and a relatively large orifice. Relative weight of the encapsulating material to the total weight of the encapsulating material and water is at least 55% and viscosity of the dispersion is at least about 300 cps measured at 70° C.

14 Claims, No Drawings

ENCAPSULATION OF MATERIALS

This is a continuation of application Ser. No. 909,390 filed May 25, 1978, now abandoned, which is, in turn, a continuation-in-part of abandoned application Ser. No. 804,019 filed June 6, 1977 which is, in turn, a continuation-in-part of application Ser. No. 693,563 filed June 7, 1976, now abandoned.

This invention relates to mechanical encapsulation of active materials such as essential oils, spices, oils, drugs, soaps, detergents, bleaches, vegetable and fruit juices, honey, brandy, alcohol, cinnamon, black pepper, fragrances, agricultural chemicals, vitamins, etc. Generally speaking, the active materials include essential oils, oleo resins and imitation flavors and fragrances. Active material is any material which is oxidized, affected by light or air in some way which deleteriously affects its shelf life, or is of the type such as honey which is difficult to dry and disperse, encapsulation of which ameliorates such problems.

The encapsulated product itself is vastly superior to those known in that it can contain up to about 35%, preferably up to about 20%, of active material by weight of finished product; it has unexpectedly better shelf life; it does not stick together, and for this reason, does not require an anticaking agent; and the small amount of active material on the surface is removed during the drying step thus obviating the solvent wash step, which is used when preparing some known products. Analysis of my product showed that it was a more complete flavoring than a conventionally spray dried product for the reason that my product retained more of the low boilers such as acetaldehyde and butylacetate, which are important flavor notes.

In particular, this invention relates to encapsulation of water-insoluble active materials such as essential oils, oleo resins and imitation flavors and fragrances, in a matrix of hydrolyzed starch or hydrolyzed dextrin.

The food industry is probably the chief user of encapsulated materials, especially in convenience foods where only a minor portion of the product is encapsulated, such as flavors, leavening agents, oils, fats, etc. Encapsulation of flavor ingredients permits their handling as dry powders, improves protection during shelf storage, provides controlled release during cooking or mastication, reduces the need for initial flavor overages to compensate for volatilization or loss of key flavor notes, and allows mixing of flavors with products containing incompatible materials. Encapsulation is used to prevent or retard oxidation of the terpenes in the flavor ingredients which, if allowed to take its course, leads to formation of peroxides of unpleasant taste. Since problems involved in storage and utilization of active materials are greatly complicated by their sensitivity to the effects of heat, light, air and moisture, my method alleviates such problems by shielding the active materials from the effects of the elements.

With encapsulation, fats and cooking oils can be converted to free flowing powders for preparation of dry food mixes with decreased tendency to cake or to penetrate packaging materials. Encapsulation can also provide protection of sensitive fats and oils against oxygen and subsequent rancidity or poor taste.

Leavening agents can be protected against moisture by encapsulation. Materials, such as honey, which are difficult to dry and disperse, are encapsulated to facilitate drying, dispersion and utilization thereof in general. As everyone should appreciate, dispensing and dispersing of honey in water is very laborious and messy as compared to dispensing of encapsulated honey in free flowing form, which is readily soluble in water.

Some illustrative applications for the encapsulated products described herein include dry beverage mixes, confections, fruit and vegetable juices, and foods in general. The encapsulated product, which is free-flowing and in powder form, generally functions to enhance flavor or fragrance and it can also constitute a food item itself, as in the case of encapsulated honey. The product can be added to mixes and then reconstituted with a liquid such as milk or water, or it can be sprinkled onto food or mixed with other ingredients and used in other applications such as toiletries and cosmetics.

The known pertinent prior art includes Swisher U.S. Pat. No. 2,809,895; Schoch U.S. Pat. No. 2,876,160; Swisher U.S. Pat. No. 3,041,180; Evans et al U.S. Pat. No. 3,159,585; Glicksman et al U.S. Pat. No. 3,264,114; Feldman U.S. Pat. No. 3,554,768; Beck U.S. Pat. No. 3,704,137; Knapp U.S. Pat. No. 3,736,149; Sato et al U.S. Pat. No. 3,786,159; and Fry U.S. Pat. No. 3,821,436.

My encapsulation method includes the steps of admixing encapsulating material and active material in water and spray-drying the resulting dispersion without injecting carbon dioxide into the dispersion. Suitable dispersions have solids concentration of 60 to 95% prior to spray drying. The solids include the encapsulating material and the active material, in most cases. Solids do not include plasticizing agents such as sugar, alcohol, sodium chloride, etc., which have the effect of thinning the dispersion. The weight percent of the encapsulating material to the total weight of the encapsulating material and water is at least 55% and Brookfield viscosity of the dispersion, which includes water, the encapsulating material and the active material, is at least 300 cps and preferably at least 500 cps, measured at 70° C. Maximum viscosity of a suitable dispersion is up to about 20,000 cps measured at 70° C. Since the encapsulating material is generally soluble in water and insoluble in alcohol, it will solubilize in water to form an aqueous solution, which will be described as such herein. Since most of the active materials are insoluble in water, i.e., essential oils and oleo resins, a mixture thereof in water will form a dispersion. This term will be used although some active materials are soluble in water such as, for example, honey, brandy, alcohol, etc.

In a preferred embodiment, weight percent of the encapsulating material to the total weight of the encapsulating material and water is at least 60% and more preferably at least 65%, whereas Brookfield viscosity of the dispersion prepared from encapsulating material, active material and water is above 1000 cps, corresponding viscosity of the dispersions at the upper end is up about 12,000 cps, measured at 70° C. The dispersions described herein will have solids concentration of 70 to 85% prior to spray drying.

The fact that relatively viscous dispersions, of the kind described herein, could be spray dried, appeared incredible to persons skilled in this art when they were informed of my discovery. A number of patents disclose spray drying of dispersions containing in excess of 60% and 70% solids, however, in each instance, the dispersions include materials which reduce viscosity thereof and permit spray drying thereof in a conventional manner. Examples of such materials are sugars, alcohols, calcium chloride, sodium chloride, glycol, glycerol, urea, diciandiamide, ammonium thiacyonate, formamide, maltose syrups, and corn syrup which act as plasticizers and reduce viscosity of the dispersions. For instance, Example 8 in Sato et al U.S. Pat. No. 3,786,159 describes a dispersion containing in excess of 75% solids and in excess of 65% starch to the total weight of starch and water. Since Sato et al encapsulate vodka, Brookfield viscosity of the dispersion is only about 270 cps at 70° C. In Example 1 of the Fry U.S. Pat. No. 3,821,436, a dispersion is disclosed having solids of about 73% and amount of cereal solids to the total weight of cereal solids and water of about 67%. The bacon flavor is not defined by Fry and for this reason, it is impossible to duplicate his dispersion although Brookfield viscosity was measured of a dispersion containing bacon flavor that was found in the lab which gave viscosity of about 480 cps at 70° C. The bacon flavor that was used was obtained from Dragoco Inc., as imitation bacon flavor No. 9-792590 containing hydrolyzed plant protein, pure hickory smoke flavor and natural spice concentrates, all spray dried. For comparison purpose, Brookfield viscosity at 70° C., with #3 spindle at 30 rpm of a dispersion prepared from 70 parts Maltrin-10, 30 parts water and 20 parts orange essence oil, was 3360 cps.

Referring to my preferred method more specifically, the dispersion to be spray dried is prepared by dissolving the encapsulating material in water to make a solution and then adding the active material to form a dispersion. Water is heated in a steam jacketed kettle equipped with an agitator, such as the lightening mixer. Depending on the active material, water is heated to a temperature at which the aqueous dispersion of the active material is not too viscous to be handled. This temperature for most materials is about 50° to 70° C. Although the water temperature can be in excess of 70° C., normally it should be above about 50° C. since viscosity of dispersions containing the active material is too great below 50° C. The active material is added to the solution and the resulting dispersion agitated for about 1 to 2 minutes until it becomes homogeneous. Depending on the active material, this dispersion may become thinner or thicker after addition thereof, and can also be rendered homogeneous by passing it through a standard milk homogenizer. Heat is removed after addition of the active material.

Before adding the active material to the aqueous solution of the encapsulating material, an antioxidant and/or emulsifier can be admixed with the active material. Amount of the antioxidant may vary between 0.05 and 0.5% whereas amount of the emulsifier is in the range of 0.1 to 10% and preferably below about 2%, these amounts being based on the weight of the active material. The antioxidant is added to the active material before the active material is added to the solution of the encapsulating material whereas the emulsifier can be added either directly to the active material or the aqueous dispersion of the encapsulating material and the active material. The point of adding the emulsifier depends on the specific emulsifier employed. For instance, acetylated tartaric acid ester of monoglyceride is added to the active material whereas mono and diglycerides are added to the dispersion.

The dispersion is then spray dried by means of a high pressure feed pump where the feed pressure can range from about 1500 up to 20000 psi, preferably from 2000 to 8000 psi, especially from 3500 to 5500 psi, depending on the orifice size, temperature of the inlet air and air volume. Presently, no pump is available which can generate pressure in excess of about 20,000 psi and this is the reason for the stated limitation since higher pressures could conceivably be used in the future.

Manufacturers of spray drying equipment generally recommend small orifices with small vortex devices or larger orifices with larger vortex devices for spray drying dispersions. For instance, Spraying Systems Company matches a nozzle having 0.031" orifice with either #220, #416 or #421 core; or a 0.055" nozzle with #416, #421 or #425 core; or a 0.070" nozzle with #425 or #625 core. I have discovered that a nozzle with a relatively large orifice operates exceedingly well with a relativel small vortex creating device, the core in this instance. In a pilot plant box spray dryer of 12'×8'×8', a nozzle with an orifice of 0.055" performed very well at normal feed pressure with a #220 core. The #220 core has 2 grooves 0.02" wide and 0.031" deep. Unless pressure is drastically increased, as for instance by doubling it or even higher, the general criterion of a nozzle with a relatively large orifice when coupled with a relatively small vortex device will produce excellent results. Generally speaking, nozzle orifices of 0.020", 0.031" and are considered small and examples of small cores are the #220 and #416. With Delevan system, excellent results would be obtained with 0.107", 0.102", 0.099" or 0.92" nozzle and SC vortex device.

Drying rate with my system is 3 to 4 times the normal rates and this can be accomplished at normal pressures by using a large orifice nozzle with a small vortex device. If one were to follow conventional procedure for obtaining higher flow rates, he would use a large orifice nozzle with a large vortex device without increasing pressure. For instance, a #54 orifice and 220T core at 3000 psi on the feed pump, which represent my invention, allow 42.8 gallons per hour to pass through whereas ordinarily, a #72 orifice and 220T core, a prior art combination, may be used at 3000 psi to yield a flow rate of 19.0 gallons per hour.

Relative amounts of encapsulating material and water to prepare the aqueous dispersions per one part by weight of the active material can vary from 2 to 15 parts, preferably from about 3.5 to 5 parts of the encapsulating material and from 0.5 to 7 parts, preferably from about 1 to 2.5 parts of water.

Sugar, such as sucrose, lactose or dextrose, can be added to the aqueous dispersion in order to reduce viscosity therof, since sugar acts as a plasticizer. Amount of sugar can vary to the extent where from 5 up to 30% of the encapsulating material is replaced therewith. Use of sugar should be avoided, however, since it increases hygroscopicity of spray dried products.

Suitable encapsulating materials include starch, gums and gelatin. In a preferred embodiment, modified starch in its myriad forms, including dextrins, is used, as well as hydrolyzed gums and hydrolyzed gelatin. The hydrolyzed or modified encapsulating agents impart a lower viscosity and for this reason, they are easier to work with and result in better products. The Schoch et al patent describes the various modified starches that can be used as encapsulating material. The gums which are suitable as encapsulating agents, preferably in hydrolyzed form, include gum arabic, larch, pectin, tragacanth, locust bean, guar, alginates such as sodium alginate and propylene glycol alginates, carrageenans, cellulose gums such as carboxymethyl cellulose, and karaya.

The hydrolyzed starch suitable for my purpose, in the preferred embodiment, has a dextrose equivalent of 0.25 up to about 20, preferably 5 to 15. Hydrolyzed starch having DE above about 20 does not appear to be as suitable since products made therewith have a higher loss of the active material, are hygroscopic and consequently have a tendency to agglomerate. At the lower extreme is any hydrolyzed starch having a detectable DE. This appears to be the same material disclosed in the Beck U.S. Pat. No. 3,704,137 where he refers to it as being hydrolyzed cereal solids. These low DE starch hydrolysates are water-soluble although they need not be totally water-soluble, and easily digestible carbohydrates.

A wide range of starch hydrolysates have been produced ranging in DE up to 95. DE denotes the total reducing sugar content on a dry basis. Until recently, these starch hydrolysates, also called maltodextrins and dextrins, were produced from various starches by acid hydrolysis. This process results in products which are not completely soluble in water, contain native starch and have a cereal or acid-hydrolyzed taste. Suitable starches are derived from corn, waxy maize, tapioca, etc.

In the past few years, however, now processing techniques involving enzymatic hydrolysis have resulted in almost tasteless, water-soluble, low DE hydrolysates that can be used at very high levels without masking flavors. The low DE hydrolzed cereal solids may be obtained commercially from Grain Processing Corporation under the name of Maltrin-10, which has a DE of 10, Maltrin-15, which has a DE of 15, etc. Such products can also be obtained commercially from CPC International, Inc., under the name of Mor-Rex. American Maize Products, National Starch, and Anheuser Busch also market similar products.

Most of the work in the instant development thus far has been carried out with products hydrolyzed by enzymes since these are the ones which are commercially available and have more suitable properties. For instance, Maltrin-10 has high viscosity, good bodying effect, is completely tasteless, has no sweetness, is easily dispersible and is resistant to caking. It can absorb up to 13% moisture and still remain free flowing.

Other suitable encapsulating materials include dextrins, especially carboxylated dextrins derived from oxidized starches containing a controlled amount of carboxyl groups. These carboxylated dextrins can be prepared from oxidized cereal starches such as corn, wheat, waxy maize and waxy sorghum starches. Carboxylated dextrins derived from oxidized root starches, such as tapioca and potato starches, may also be employed where desired by the practitioner. All of these carboxylated dextrins are fully compatible with all types of volatile oils, perfumes, flavors and other relatively water-insoluble substances, yielding encapsulated products which are devoid of any color, aroma or taste which is ordinarily associated with uncarboxylated dextrins.

As already described, an emulsifier can be added either to the active material prior to its addition to the solution of encapsulating material or subsequently thereto in an effective amount of from 0.1 to 10%, preferably less than 2%, based on the weight of the active material. Examples of such emulsifiers are mono-diglyceride sodium sulfoacetate, diacetyl tartaric acid ester of a monodiglyceride, polymeric alkylaryl polyether alcohol, polyethylene glycol fatty acid esters, sucrose esters of fatty acids, sodium lauryl sulfate, vegetable oils, glyceryl monostearate, acetylated monoglycerides, citrus stearoptene, lecithin, gum arabic, locust bean gum, guar gum, tragacanth gum, pectin, pectin albedo, agar and algin.

To protect the active material from oxidation, addition thereto of a minor amount of an antioxidant can be made in amount of 0.05 to 0.5%, based on the weight of the active material. An antioxidant such as 4-methyl -2, 6-ditertiary butyl phenol or butylated hydroxytoluene or butylated hydroxyanisole can be selected.

The particle size of my product is in the range of 250 to 2500 microns whereas spray dried prior art products of this type have a particle size of 10 to 300 microns. My product has numerous advantages over like prior art products. My product contains higher levels of active materials than the prior art products in that as much as 15 to 20% and higher amounts thereof are encapsulated; my product is less hygroscopic, which makes it suitable for more applications; my product does not stick together and addition of anticaking agents therefore, is not necessary; my product has unexpectedly better shelf stability; and my product retains more of the low boilers in th active material.

Due to the conventional spray-drying conditions, the particles of the prior art spray dried powders are generally spherical. This is supported by Perry's "Chemical Engineering Handbook" where at middle of page 840 it is noted that one principal advantage of the spray drying method is the production of spherical particles; and the Brenner et al. U.S. Pat. No. 3,971,852 which discloses at about the middle of column 2 that the products of the spray drying process are dry, somewhat porous powders consisting of roughly spherical, convoluted particles, although in lines 10–14 in column 3 it is noted that while the particles may be of various sizes and shapes and may be hollow or solid, they are characterized by cellular structure. In column 3, line 22–24 of this patent, it is stated that the particles obtained by spray drying an emulsion are largely spherical.

The spray dried particles of my products are predominantly elongated, solid and non-spherical or rod-shaped in form. As the ratio of encapsulating material to water is increased and viscosity of the dispersion is also increased, preponderance of the rod-shaped particles increases over the spherical particles. Three 45% solids dispersions prepared from 41.0 parts Maltrin-10 hydrolyzed starch, 59.0 parts water and 7.2 parts of a flavoring material produced a spray dried product is powder form composed of spherical particles. Three 60% dispersions prepared from 56.0 parts Maltrin-10, 44.0 parts water and 9.9 parts flavoring produced a product having a preponderance of rod-shaped particles. Dispersions containing 75% solids resulted in powders consisting of rod-shaped particles. This has been confirmed by photomicrographs of orange essence, imitation raspberry, celery, and other encapsulated products at 50 to 200 magnifications.

Since the transition from spherical to rod-shaped particles is difficult to define precisely because it is so gradual, it is desired to cover herein powder products and methods which result in products having a substantial portion of the particles of rod-shape. If there should be need for a more precise definition of the term "substantial" as used herein, a guess would place the figure of rod-shaped particles in my product at about 40% and above of a representative sample.

The present invention will be more clearly understood by reference to the following examples which include a preferred embodiment of the present invention.

EXAMPLE I

Three pounds five ounces of water was heated to 150° F. and eight pounds fifteen ounces of Maltrin-10 was added with vigorous agitation. While maintaining the temperature of 150° F., agitation was continued until a homogeneous aqueous solution was obtained, which took about 10 minutes. 0.54 of a gram of butylated hydroxyaninsole and 19 grams of Tween 80 (polyoxyethylenesorbitan monooleate) were mixed in 1.2 pounds of California cold pressed lemon oil to form a dispersion which was admixed with the aqueous solution with agitation until the resulting mixture was homogeneous. The last-mentioned agitation step took about 1 minute. When the dispersion was added to the aqueous solution, heat was removed and temperature dropped to about 145° F. after agitation was completed. The resulting mixture was homogenized at 3500 psi on Cherry Burrell single stage homogenizer and spray dried, with the feed pump operating at 2500 psi. Nozzle orifice was #56 (0.0465"), core #220 (Spraying Systems Company) with inlet and outlet temperatures of 380° F. and 210° F., respectively.

The free-flowing encapsulated product was mixed with sugar, dry lemon juice and citric acid before water was added to form lemonade. The encapsulated product dispersed instantly and no floating oil was detected.

EXAMPLES II to VI

A number of different active materials were encapsulated pursuant to the procedure of Example I, with exceptions noted in the table below which gives relative amounts of ingredients in pounds, unless otherwise indicated, and the processing conditions.

Nozzle orifice #54 has 0.055" diameter hole and orifice #56 and 0.0465" whereas core 220T has two grooves 0.02" wide and 0.031" deep.

|  | EX. II | EX. III | EX. IV | EX. V | EX. VI |
|---|---|---|---|---|---|
| water | 25 | 50 | 33 | 42 | 33 |
| Maltrin 10 | 70 | 95 | 85 | 90 | 80 |
| (1) lipolized butter oil | 30 | — | — | — | — |
| (1) delta-deca lactone | — | 5 | — | — | — |
| (1) cold pressed orange oil | — | — | 15 | — | — |
| (1) diacetyl | — | — | — | 10 | — |
| (1) peppermint oil | — | — | — | — | 20 |
| (2) diacetyl tartaric acid of a mono-diglyceride | — | — | — | 180 gm | — |
| (2) monoglyceride sodium sulfo-acetate | — | — | — | 360 gm | — |
| (3) glyceryl monostearate | — | 23 gm | — | — | — |
| (2) butylated hydroxyanisole | — | — | 34 gm | — | 22 gm |
| (2) butylated hydroxytoluene | — | — | — | — | 22 gm |
| homogenizing pressure if used, in psi | 2500 | — | 2000 | 2500 | 4000 |
| feed pump pressure, psi | 2000 | 4500 | 3000 | 3500 | 2500 |
| nozzle orifice | #54 | #56 | #54 | #54 | #54 |
| nozzle core | 220T | 220T | 220T | 220T | 220T |

The reference numerals in the above table are identified as:
(1) material being encapsulated
(2) predissolved or dispersed in (1)
(3) predispersed in water-Maltrin solution

EXAMPLE VII

Pursuant to the procedure set forth in Example I, three separate dispersions were prepared with orange essence oil sold by Citrus Central Incorporated, imitation raspberry flavor F5832A sold by Firmenich Incorporated and oleo resin celery flavor No. 29147 sold by Stange Company at total solids level of 45%, 60% and 75%. The solids in the dispersions included Maltrin 10 hydrolized starch, the encapsulating material, and the flavoring. The dispersions were spray dried through a #56 orifice and #416 core with inlet temperature of about 400° F. and outlet temperature of about 200° F. The 45% dispersions of each flavor were spray dried at pressures of 1000 to 1500 psi, the 60% dispersions at 2000 to 2500 psi and the 75% dispersions at 4000 to 7000 psi. The following table presents relative amounts of the ingredients in parts by weight and Brookfield viscosity in cps of dispersions of orange essence oil and raspberry and celery flavors, respectively, measured at 70° C. with a #3 spindle at 60 rpm or 30 rpm.

| total solids | Maltrin 10 | water | flavoring | viscosity |
|---|---|---|---|---|
| 45% | 41.0 | 59.0 | 7.2 | 80, 35, 42 |
| 60% | 56.0 | 44.0 | 9.9 | 420, 100, 420 |
| 75% | 71.8 | 28.2 | 12.7 | 4700, 2400, 12,000 |

Photomicrographs were made of the encapsulated orange essence oil described in this example in order to examine geometrical form of the particulate products. One product was prepared from a dispersion having 45% total solids and other products were prepared from dispersions of 60% and 75% total solids. It was evident from the photomicrographs that all of the particles were spherical where the dispersion of 45% solids was used and that as the viscosity and the relative amount of the encapsulating material to water is increased, more of the particles become elongate or rod-shaped and with the dispersion of 75%, all particles appear to be rod-shaped. The 60% solids dispersion appears to have a preponderance, i.e., more than 50% of rod-shaped particles. Essentially the same thing happened with respect to imitation raspberry flavor and the celery flavor.

EXAMPLE VIII

Hydrolyzed gelatin was prepared by mixing 105 pounds of low bloom (75) gelatin with 105 pounds of water and heating the mixture to 145° F. To this mixture was added 350.7 grams of Miles Labs bromelin 1:10 having activity of 110 BTU/gram along with 8.77 grams of sodium sulfite. This mixture was held at 145° F. for 1 hour and 30 minutes following which, 90 grams of 3% hydrogen peroxide solution was added to inactivate the enzymes. Finally, hydrolyzed gelatin was spray dried.

Encapsulated product was prepared by initially heating 5 pounds of water to 140° F. and adding 12 pounds 6 ounces of enzyme-hydrolyzed gelatin, prepared as described above, with vigorous agitation. The temperature of 140° F. was maintained and agitation was continued until a homogeneous aqueous solution was obtained, which took about 10 minutes.

Heating was discontinued and 4 pounds of U. S. P. peppermint oil, containing 13.6 grams of butylated hydroxyanisole, was added to the aqueous solution with agitation until the resulting mixture was homogenous. The last-mentioned agitation step took about 1 minute. After completing agitation, the temperature dropped to about 135° F., the resulting mixture was spray dried with a feed pump operating at 5500 psi through a #56 (0.0465") nozzle orifice, Spraying Systems #220 core with inlet and outlet temperatures of 370° F. and 200° F., respectively.

The free-flowing encapsulated product was mixed with a gum base at 145° F. No peppermint oil was lost during mixing at this temperature and the product was essentially composed of rod-shaped particles.

Having described the present invention with a certain degree of particularity, it will be realized that numerous minor changes and variations, falling within the spirit and scope of this invention, will become obvious to those skilled in the art. It is not intended that this invention be limited to any of the materials which have been mentioned as specific examples, nor by the specific proportions which have been give for the sake of illustration, but it is intended to claim all novelty inherent in the invention, as well as all obvious modifications and variations thereof.

I claim:

1. Method for preparing encapsulated product comprising preparing a dispersion of encapsulating material, active material and water wherein weight of the encapsulating material to the total weight of the encapsulating material and water is at least about 55% and Brookfield viscosity of the dispersion containing the encapsulating material, the active material and water is at least about 300 cps measured at 70° C. wherein the encapsulating material is selected from the group consisting of modified starch, hydrolyzed gums, hydrolyzed gelatin and mixtures thereof and the active material is selected from the group consisting of essential oils, oleo resins, imitation flavors and fragrances and mixtures thereof; and spray drying said dispersion through a vortex creating device sufficiently small and an orifice sufficiently large to permit spray drying of said dispersion at a feed pressure of at least 1500 psi to produce a product having at least a substantial portion of its particles in elongated, non-spherical, rod-shaped form.

2. Method of claim 1 wherein viscosity of the dispersion is at least about 500 cps; the method is further characterized by spray drying at a feed pressure of about 2000 to 8000 psi.

3. Method of claim 1 wherein weight of the encapsulating material to the total weight of the encapsulating material and water is at least about 60%, the encapsulating material is hydrolized starch having DE of about 0.25 to 20, the active material is an essential oil, and viscosity of the dispersion is at least 1000 cps; the method is further characterized by spray drying at a feed pressure of about 2000 to 8000 psi.

4. Method of claim 3 including the step of heating and maintaining the dispersion at about 50° to 70° C. to reduce viscosity of the dispersion so that it can be pumped more easily.

5. Method of claim 2 wherein viscosity of the dispersion is at least 1000 cps; the method further includes the step of adding, during preparation of the dispersion, an ingredient selected from the group consisting of emulsifying agents in amount of 0.1 to 2%, antioxidants in amount of 0.05 to 0.5%, and mixtures thereof; the amounts herein are based on the weight of the active material.

6. Method of claim 3 wherein the feed pressure is about 3500 to 5500 psi and weight of the encapsulating material to the total weight of the encapsulating material and water is at least 65%.

7. Method of claim 3 wherein relative amounts of the components in the dispersion per one part by weight of the active material are from about 2 to 15 parts of the encapsulating material and from about 0.5 to 7 parts of water.

8. Method of claim 3 wherein relative amounts of the components, per one-part by weight of the active material are about 3.5 to 5 parts of the encapsulating material and from about 1 to 2.5 parts of water.

9. A free flowing spray-dried powder product having at least a substantial portion of its particles in elongated, non-spherical, rod-shaped form comprising an active material encapsulated in an encapsulating material, relative amounts being from about 2 to 15 parts by weight of the encapsulating material for each part of the active material prepared by the method of claim 1.

10. Product of claim 9 having particle size of about 250 to 2500 microns which includes about 0.05 to 0.5% of an antioxidant and about 0.1 to 2% of an emulsifier, based on the weight of the active material.

11. Product of claim 9 wherein the particle size of the product being about 250 to 2500 microns.

12. Product of claim 9 wherein the encapsulating material is hydrolized starch having DE of about 0.25 to 20 and the active material is an essential oil wherein the amount of the encapsulating material is 3.5 to 5 parts per one part of the active material.

13. Product of claim 9 wherein the encapsulating material is selected from the group consisting of hydrolyzed gelatin, hydrolyzed starch having DE of 0.25 to 20, and mixtures thereof; and the amount of the encapsulating material is from about 3.5 to 5 parts for each part of the active material.

14. Method of claim 1 wherein the encapsulating material is selected from the group consisting of modified starch, hydrolyzed gums, and mixtures thereof.

* * * * *

UNITED STATES PATENT AND TRADEMARK OFFICE
CERTIFICATE OF CORRECTION

PATENT NO. : 4,276,312
DATED : June 30, 1981
INVENTOR(S) : Carleton G. Merritt

It is certified that error appears in the above—identified patent and that said Letters Patent is hereby corrected as shown below:

Title page, item [76], insert the following:

--Assignee: Borden, Inc.
                   Columbus, Ohio--

Signed and Sealed this

Twenty-second Day of June, 1993

Attest:

MICHAEL K. KIRK

*Attesting Officer*     *Acting Commissioner of Patents and Trademarks*